United States Patent [19]

Pleau et al.

[11] Patent Number: 5,213,020
[45] Date of Patent: May 25, 1993

[54] THIN-KERF CIRCULAR HEAD SAW AND SAW GUIDE

[75] Inventors: Julien H. Pleau, Ottawa; William F. Love, Orleans, both of Canada

[73] Assignee: Forintek Canada Corp., Ottawa, Canada

[21] Appl. No.: 805,616

[22] Filed: Dec. 12, 1991

[30] Foreign Application Priority Data

Aug. 15, 1991 [CA] Canada ................................ 2049257

[51] Int. Cl.$^5$ .............................................. B23D 47/02
[52] U.S. Cl. ........................................ 83/828; 83/829
[58] Field of Search ................. 83/821, 824, 827, 828, 83/829

[56] References Cited

U.S. PATENT DOCUMENTS

| | | |
|---|---|---|
| 128,776 | 7/1872 | Arthur . |
| 140,157 | 6/1873 | Palmer . |
| 173,907 | 2/1876 | Collins . |
| 186,541 | 1/1877 | Chaffee . |
| 222,396 | 12/1879 | Guernsey . |
| 270,387 | 1/1883 | Carman . |
| 292,331 | 1/1884 | Liddell . |
| 341,055 | 4/1886 | Robb . |
| 378,513 | 2/1888 | Marshall . |
| 385,131 | 6/1888 | Murray . |
| 535,325 | 3/1895 | Elliott . |
| 561,411 | 6/1896 | Marks . |
| 1,061,869 | 5/1913 | Register ................................ 83/828 |
| 1,704,581 | 3/1929 | Smith ................................... 83/828 |
| 3,550,654 | 12/1970 | Thrasher . |
| 3,667,514 | 6/1972 | Krog . |
| 3,703,915 | 11/1972 | Pearson . |
| 3,772,956 | 11/1973 | McMillan ......................... 83/821 X |
| 3,817,143 | 6/1974 | Jones . |
| 3,828,642 | 8/1974 | Orendi ............................. 83/828 X |
| 3,941,110 | 12/1988 | Fraser . |
| 4,136,590 | 1/1979 | Kordyban et al. . |
| 4,563,928 | 1/1986 | Salomonsson ..................... 83/821 |
| 4,930,387 | 6/1990 | Miettinen . |

FOREIGN PATENT DOCUMENTS

| | | |
|---|---|---|
| 1061222 | 8/1979 | Canada . |
| 1224702 | 7/1987 | Canada . |
| 1272274 | 7/1990 | Canada . |

OTHER PUBLICATIONS

Publication Ari News No. 1, 1985 from ARI AB.

Primary Examiner—Douglas D. Watts
Assistant Examiner—Rinaldi Rada
Attorney, Agent, or Firm—Stanley E. Johnson

[57] ABSTRACT

A saw mill head saw having a thin-kerf circular saw blade whose diameter is in the range of 34 inches to 60 inches mounted in fixed position on a power driven mandrel for rotation therewith. The mandrel is journalled on bearings that can be adjustably positioned selectively to vary the angle of mandrel relative to the direction of travel of a log that moves while being cut. The saw blade is guided by a rigid robust saw guide unit located at the in-feed side of the saw and at a position below a saw cut made during operation of the head saw. The saw guide has a channel or gap portion receiving therein a selected portion of the saw blade and it is provided with a first group of discrete spaced apart blade contact pads and a second similar group with such groups being disposed on respective opposite sides of said saw blade. Two contact pads in one group are spaced apart from one another in a direction circumferentially around the saw blade and a third one is spaced from the other two in a direction radially inwardly. The contact pads are replaceable and selectively adjustable and spaced about .001 inches from the face of the saw blade. The saw guide is mounted so as to be selectively adjustably positionable relative to the saw blade.

18 Claims, 2 Drawing Sheets

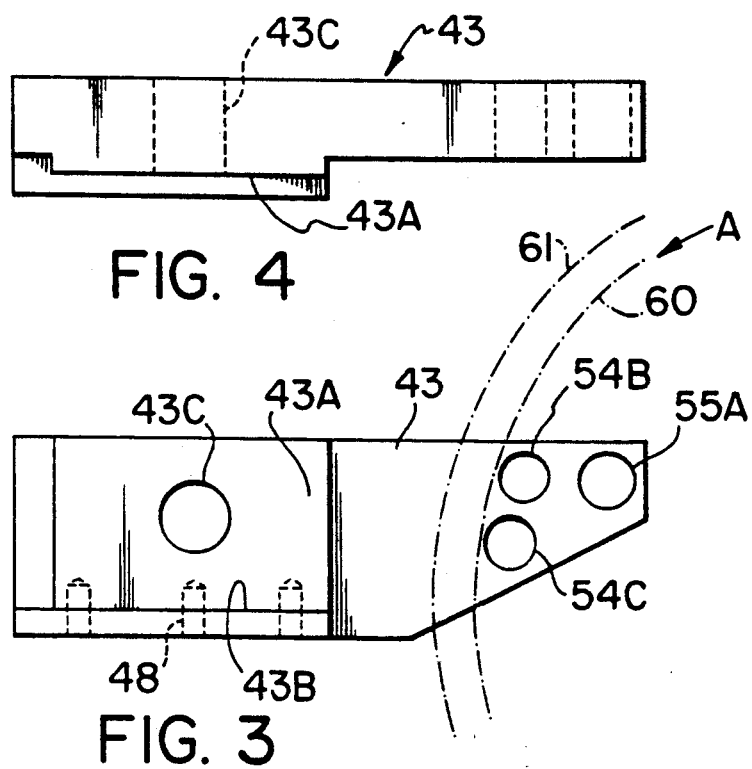
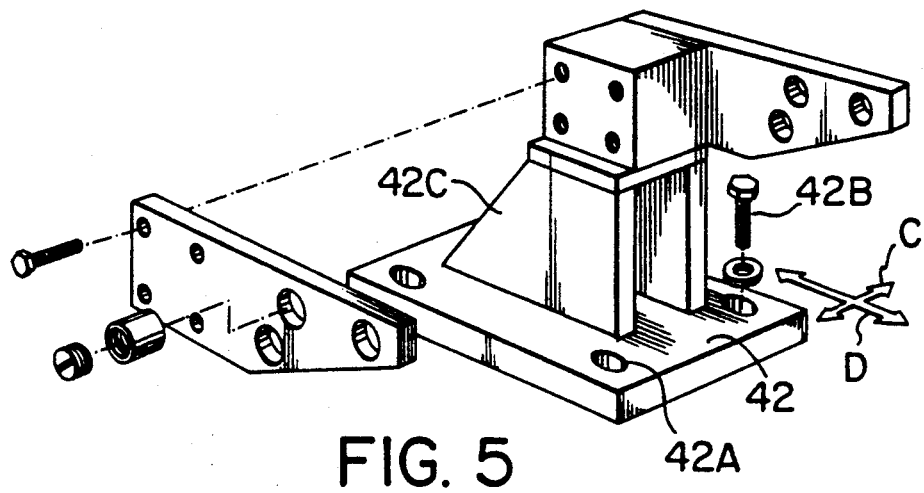

THIN-KERF CIRCULAR HEAD SAW AND SAW GUIDE

FIELD OF INVENTION

This invention relates to saw mill head saws and more particularly to a head saw with a thin-kerf circular saw blade, to such head saw with a multi pad contact rigid saw blade guide assembly and to a thin-kerf blade for a head saw.

BACKGROUND OF INVENTION

Sawing machines are classified according to basic machine design, i.e., band saw, gang saw, chain saw, circular saw and they are further classified according to the specific operation for which they are used. A head saw is the primary log break-down saw in a saw mill and a resaw is one used for ripping the so produced cant into boards. The primary distinction between a head saw and a resaw, where each is of the circular saw type, is the diameter of the circular saw blade. Typically resaws have a diameter under 30 inches and the head saw circular blades are in the range of 34 to 60 inches. The latter are referred to as large diameter circular saw blades while the former are referred to as small diameter circular saw blades.

Large diameter saw blades are conventionally thicker than small diameter saw blades and conventionally head saws have removably insertable teeth. In order to removably insert the teeth the gullet must be machined to receive a shank and a removable bit. The shank and bit and machining of the gullet contributes to a costly saw blade and high maintenance costs.

As discussed in the foregoing, a first major distinction between head saws and resaws is the diameter of the blade and the second distinction is the difference in the blade construction. It is known to use thin-kerf blades for small diameter saw blades but thin-kerf blades have not been used for large diameter blades in head saws to applicant's knowledge. The removable tooth and machined gullet is also another distinction present in the head saws but not in resaws.

A further distinction between head saws and resaws is that the latter are normally ganged on a common shaft and float axially along the shaft, guides being used to maintain the position of the floating saws to ensure accuracy and consistency in cutting the multiple boards from a cant. This is possible because the blades are always in a plane parallel to the path of travel of the cant being cut. There is no "lead angle" as required in head saws. Further discussion of this will occur later. Examples of ganged blade resaws are found in the teachings of U.S. Pat. No. 3,817,143 issued Jun. 18, 1974 to A. U. Jones and U.S. Pat. No. 3,703,915 issued Nov. 28, 1972 to H. C. Pearson. Both of these references teach the use of thin-kerf blades on small diameter blade resaws where the saw blade is shiftable along the arbour and kept in line by means of guides. The guide in U.S. Pat. No. 3,817,143 is located at the in-feed side of the saw and at the out-feed side of the cut, i.e., below the cut in the cant during operation of the saw. In U.S. Pat. No. 3,703,915 the guide is provided with two spaced apart contact pads on each of opposite sides of the blade, the guide being located at the in-feed side of the cant and at the in-feed side relative to the cut in the cant during operation of the saw. Another example of a thin-kerf guided saw that floats on a saw arbour is found in the teachings of U.S. Pat. No. 3,550,654 issued Dec. 29, 1970 to E. W. Thrasher. Further examples of ganged and guided saw blades are found in the teachings of Canadian Patents 1,272,274 issued Jul. 31, 1990 and 1,224,702 issued Jul. 28, 1987. Head saws differ from resaws by having the saw blade fixed to the arbour instead of floating.

Saw blade guides are known for guiding blades that are fixed to a mandrel for rotation therewith and by way of example reference may be had to the following U.S. Pat. Nos. 848,548 issued Mar. 26, 1907 to A. Harrold; 561,411 issued Jun. 2, 1896 to A. Marks; 140,157 issued Jun. 24, 1873 to F. Palmer; 292,331 issued Jan. 22, 1884 to W. Liddell; 394,110 issued Dec. 4, 1888 to D. Fraser; 173,907 issued Feb. 22, 1876 to J. Collins; 378,513 issued Feb. 28, 1888 to J. Marshall; 385,131 issued Jun. 26, 1888 to D. Murray. In these patents the majority of the saw guides are adjustable and have removable or replaceable pads that engage the side face of the blade. Further examples of adjustable saw guides variously constructed will be found in the teachings of U.S. Pat. Nos. 222,396 issued Dec. 9, 1879; 128,776 issued Jul. 9, 1872; 341,055 issued May 4, 1886; 186,541 issued Jan. 23, 1877; 535,325 issued Mar. 5, 1895 and 270,387 issued Jan. 9, 1883. These guides are all single pad contact types.

There exists today a number of saw mills in small to medium operations where replacement of existing equipment is uneconomic but with some changes to existing equipment the now considerable wastage and slow production could be improved.

SUMMARY OF INVENTION

One of the objects of the present invention is to improve the production and quality of production of existing mills by substituting a thin-kerf large diameter saw blade in the head saw for the now used thick blade that has removably insertable teeth.

A further principal object of the present invention is to provide head saws with a thin kerf, large diameter blade that is of uniform thickness and that has stellite tips fixed on teeth which have been punch formed in the blade.

A further principal object of the present invention is to provide a robust and rigid blade guide and one that has multiple contact pads for use with the thin-kerf large diameter head saw blade.

A further principal object of the present invention is to improve production and the quality of production of existing mills by providing for making adjustments and fine tuning the set up and making adjustment of various variable parameters to maximize production.

Mill head saws normally are fixed in location and the logs are transported on a rail guided carriage so as to move relative to the saw. Misalignment of the saw arbour relative to the rails and misalignment of the rails contribute to inconsistent poor quality products.

A further principal object of the present invention is to provide a head saw with a thin kerf blade and adjustably movable journals for the arbour so that the saw blade can be precisely positioned relative to the movement of the guided carriage. This allows one to adjustably set the head saw with a selected lead angle as may be required by mill conditions and operating parameters.

In keeping with the foregoing there is provided in accordance with one aspect of the present invention a saw mill head saw comprising a power driven mandrel, a thin-kerf circular saw blade having a diameter in the range of 34 inches to 60 inches mounted on said mandrel for rotation therewith, means maintaining said saw blade in a fixed position on said mandrel and a rigid robust saw guide unit located at the in-feed side of the saw and at a position below a saw cut made during operation of the head saw, said saw guide having a narrow channel or gap portion receiving therein a selected portion of the saw blade and into which project adjustably positionable blade contact means for guiding the same. In the preferred form the saw guide is provided with a first group of discrete spaced apart blade contact pads and a second similar group with said first and second groups being disposed on respective opposite sides of said saw blade, two of said contact pads of the respective groups being spaced apart from one another in a direction circumferentially around the saw blade and a third one being spaced from the other two in a direction radially inwardly therefrom towards the center of the saw blade.

In accordance with a further aspect of the present invention there is provided a saw mill head saw comprising a power driven mandrel mounted on selectively adjustably movable journals, a thin-kerf circular saw blade having a diameter in the range of 34 inches to 60 inches mounted on said mandrel for rotation therewith, means maintaining said saw blade in a fixed position on said mandrel and a rigid robust saw blade guide located at the in-feed side of the saw and at a position below a cut made during operation of the head saw, said guide having a gap portion receiving therein a selected edge portion of the saw blade and a selectively removable replaceable contact pad on each of opposite sides of said saw blade, contact pad mounting means for selectively adjustably positioning said contact pads and guide mounting means for selectively adjustably positioning the saw blade guide relative to the saw blade.

LIST OF DRAWINGS

The invention is illustrated by way of example in the accompanying drawings wherein:

FIG. 3 is an elevational view of the stationary jaw of the guide illustrated in FIG. 1 and on an enlarged scale;

FIG. 4 is a top plan view of FIG. 3; and

FIG. 5 is an oblique exploded view of another guide of the present invention.

DESCRIPTION OF PREFERRED EMBODIMENTS

Figure 1:
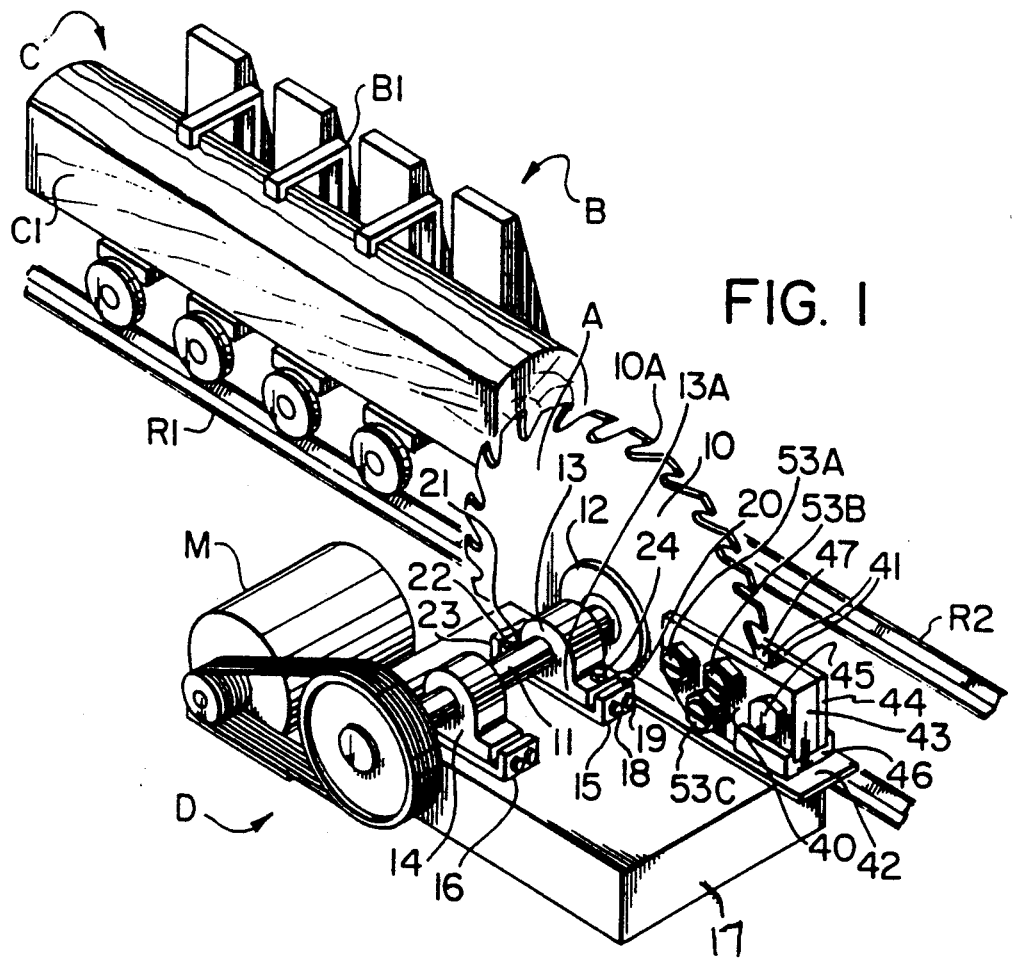
FIG. 1 is an oblique diagrammatic illustration of a head saw in a mill with a log after having passed through the head saw and having a slab removed from one face thereof.

The present invention is exemplified by the diagrammatic illustration in FIG. 1 of a head saw in a saw mill which may be the result of modifications to an existing mill or a new installation. The head saw is the one in a mill which does the primary cut on a log removing a slab from each of the four faces (one face at a time or opposite faces in cases where two saws are used) to reduce the log to a cant that is rectangular or square for later cutting by resaws into lumber. In FIG. 1 the head saw is designated generally by the reference A which is fixed in location relative to a rail and carriage system B. A log C is shown mounted on a carriage after having made a pass by the saw which has removed a chordal slab leaving a first flat face C1. The log is clamped on the carriage by a series of clamps designated B1. The carriage runs on rails and is moved by means not shown to provide the desired feed speed for the installation in question.

The head saw A, in accordance with the present invention, is provided with a large diameter thin-kerf circular saw blade. The saw blade is fixedly secured to a shaft or arbour 11 in a conventional manner by having a central portion thereof clamped between a pair of collars 12 on the shaft. The end of the shaft with a nut threaded thereon abutting the outer collar is not shown.

The shaft 11 is journalled for rotation by a pair of pillow block bearings 13 and 14 that are spaced apart from one another longitudinally along the shaft. The pillow block bearings 13 and 14 are selectively adjustably movable on respective ones of a pair of saddles 15 and 16 which in themselves are securely anchored to a rigid foundation or base structure 17. If desired the saddles can be mounted on the base structure in such a manner as to be selectively adjustably positionable for effecting a course adjustment in positioning the axis of rotation of the arbour 11 with respect to the carriage movement. Fine tuning of the adjustment is made by selectively adjusting the position of the bearings 13 and 14 on their respective saddle. These adjustments permit setting the saw blade at a desired lead angle for the installation and wood species in question.

Both pillow block bearings and saddles are identical and referring to saddle 15 it will be noted two studs 18 and 19 are threaded into an upstanding lug 20 at one end of the saddle and similarly two threaded studs 21 and 22 are threaded into an upstanding lug 23 at the opposite end of the saddle. The pair of studs 18 and 19 and the other pair of studs 21 and 22 face one another and abut respectively opposite end faces of the base 13A of the pillow block bearing 13. For safety precautions the base 13A may be held captive relative to the saddle by respective ones of a pair of hold-down studs 24 or other suitable means which also can be used to lock the bearings in position.

The saw arbour in FIG. 1 is diagrammatically illustrated as being driven by a motor M through belts and pulleys providing a drive designated generally by the letter D. The location of the axis of rotation of the shaft can be coarsely and finely adjusted by means discussed hereinbefore to provide the desired angle it makes with the direction of travel of the carriage. The axis of rotation of the shaft is not exactly perpendicular to the direction of travel for head saws whereby the plane of rotation of the saw blade is not parallel to the path of travel of the carriage. It might here be mentioned the path of travel of the carriage is defined by rails R1 and R2 on which the carriage is mounted for movement. The arbour is adjusted so that there is a slight angle of attack on the blade, relative to the path of travel of the log. This is referred to as the blade "lead angle" and is required to ensure the blade doesn't wander or "run out" of the log as the carriage moves.

The angle of attack, i.e. lead angle, will vary from one mill to another dependent upon many factors such as the wood species, dryness of the logs, diameter of the logs to be cut, the diameter of the saw blade, feed speed, frozen or unfrozen, (i.e. state), kerf width and wood density. The lead angle is greater for hardwoods than for softwoods and is greater for frozen logs than for unfrozen logs. The lead angle increases with an increase in density and with an increase in kerf thickness. Too much lead angle will force the saw to lead into the log while too little will cause it to run out.

The amount of lead on circular headsaws is determined by the clearance at the back end of the saw relative to a straight line path followed by the carriage that carries a log to be cut. This clearance is measured in thousands or fractions of an inch to determine the distance between the back end of the saw and the line of the carriage. The exact amount of saw clearance is very critical to the sawing accuracy but could still vary (very slightly) from one mill to another, even if both mills use the same equipment and cut the same type of logs. The basic clearance used for a "thin-kerf" arrangement is 0.030" to start with. Re-adjustment is then made as needed and experience has shown that some adjustments could go as high as 0.035" and as low as 0.028". But once adjusted, these clearances are not changed—unless additional wear is introduced to the system.

tion. The length of the arbour and the diameter of the arbour are factors which must be taken into account along with the drive speed and saw diameter in addition to correct alignment. These other factors, however, are peculiar to each mill operation as is also the correct feed speed and correlation thereof to the depth of cut and saw tooth and gullet shape and size. The rim speed of the thin blade is preferably run near or at its maximum. In addition to the foregoing the log transport system must also be modified or designed to provide an accurate path of travel, all of these variable parameters being adjusted to optimize the saw mill operation.

The following is a tabulation by way of example of recommended feed speeds, tooth bite and gullet loading for hardwoods.

Saw Specifications -
Diameter 44", number of teeth—44, saw kerf 0.200", gullet capacity 2.019 in$^2$, logs length 8 feet

| Dept of Cut (in.) | Time to complete cuts (seconds) | Feed Speeds (ft per min.) | Tooth Bite (in.) | Volume of Sawdust (in.$^2$) | Gullet Capacity (in.$^2$) | Gullet Loading (%) | Recommended time to complete cuts (seconds) |
|---|---|---|---|---|---|---|---|
| 6 | 2 | 240 | .062 | 1.116 | 2.019 | 55.2 | 3 |
| 7 | 3 | 160 | .041 | 0.861 | 2.019 | 42.6 | 3 |
| 8 | 3 | 160 | .041 | 0.984 | 2.019 | 48.7 | 3 |
| 9 | 3 | 160 | .041 | 1.107 | 2.019 | 54.8 | 3 |
| 10 | 4 | 120 | .031 | 0.930 | 2.019 | 46.0 | 4 |
| 11 | 4 | 120 | .031 | 1.023 | 2.019 | 50.6 | 4 |
| 12 | 4 | 230 | .031 | 1.116 | 2.019 | 55.2 | 4 |
| 13 | 5 | 96 | .024 | 0.936 | 2.019 | 46.3 | 5 |
| 14 | 5 | 96 | .024 | 1.008 | 2.019 | 49.9 | 5 |

Note
Feed speeds could be increased by a maximum of 5% for softwoods.

But such procedures should only be used as a temporary measure to keep a mill going for one or two shifts until the repairs are completed.

The saw blade 10 is a thin-kerf large diameter saw blade and as previously mentioned large diameter refers to diameters in the range of 34 to 60 inches. The thickness of the thin-kerf saw blade may be in the range of 0.10 inches to 0.15 inches, 0.150 inches being preferred and the kerf may be in the range of 0.14 to 0.20 inches the preferred being 0.20 inches. A blade thickness of 0.150" and kerf of 0.200" is normally used for hardwoods while the lighter 0.120" thickness and kerf of 0.170" for softwoods. Existing head saw blades have a thickness of about 0.18 inches and a minimum kerf of about 0.30 inches. The blade 10 is suitably tensioned, flat ground (or otherwise suitably formed to provide a constant thickness) and has punch formed teeth that have a stellite, graphite, tungsten carbide, ceramic or the like insert 10A welded to the tip of the tooth. The saw blade is flat ground (uniform thickness) as opposed to taper ground in existing head saw blades and by way of comparison the thin-kerf saw blade of the present invention will be driven to run at a speed of about 1,050 rpm as opposed to 750 rpm using the existing head saw blade where both blades are 44 inches in diameter. The number of teeth on the saw is approximately equal to the diameter of the saw for example, a 44 inch diameter saw will have approximately 44 teeth.

Precision mounting and positioning is provided by the previously described mounting of the arbour and this of course assumes the collars on the shaft are appropriately and precisely positioned to avoid any wobble in the blade. To modify or improve an existing mill's production the foundations are checked and carriage tracks replaced or realigned if necessary and saw collars checked and repositioned if necessary for precise loca- In a further aspect of the present invention there is a rigid robust saw guide that has multiple blade side face contact pads on each of opposite sides of the thin-kerf blade. Referring to FIG. 1 there is illustrated a saw guide 40 mounted on the rigid foundation 17 (or superstructure carried thereby) with such saw guide being located at the in-feed side of the saw below a saw cut made during operation of the saw. The saw blade guide 40 has an upper edge 41 that normally would be installed as close as possible (say within ¼ inch) but slightly below the upper edge of the collars 12 so as not to interfere with the cutting depth but at the same time be relatively close to where the blade exits from the log during a cutting operation.

The saw blade guide 40 has a base 42 fastened as by bolts or studs to the foundation 17, slots (not illustrated in FIG. 1) being provided in the base 42 for variously positioning the base of the guide thereby permitting course adjustment of the location of the guide relative to the blade. Slotted holes in the base and the stud arrangement for mounting is illustrated by way of example in the embodiment shown in FIG. 5 where the base designated 42 therein has a superstructure 42C mounted thereon for supporting the saw blade guide.

Referring again to FIG. 1 the saw guide 40 has two jaw members designated respectively 43 and 44 joined one to the other by at least one rigid bolt and nut or stud unit 45 passing therethrough with the two jaw members being further locked together by fitting partially into a U-shaped saddle type base 46. A portion of the jaw members 43 and 44 are spaced from one another providing therebetween a narrow channel or gap 47 for receiving a selected portion of the saw blade. Jaw member 43 is referred to as a stationary jaw member as it is securely fastened to the base 42 and jaw member 44 is referred to as a removable jaw member as it is secured only to the other jaw member and can readily be detached so as to allow for removal and replacement of the saw blade.

Figure 2:
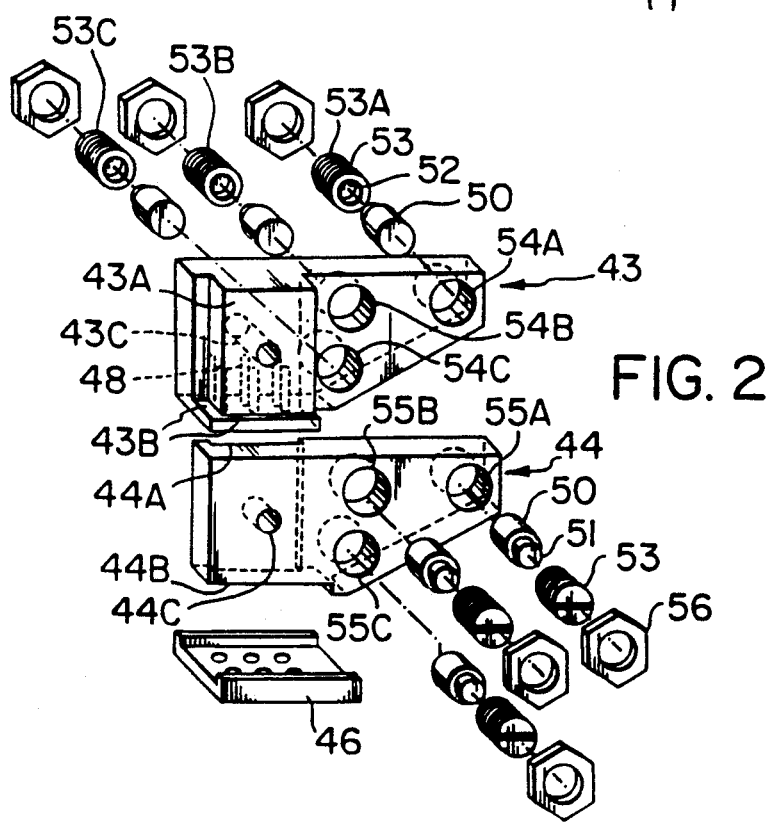
FIG. 2 is an oblique exploded view of the saw blade guide illustrated in FIG. 1.

The stationary jaw member 43 has threaded apertures in the bottom thereof (designated 48 in FIGS. 2 and 3) which receives studs that pass through apertures in the base plate 42 and the saddle base 46. A preferred construction of the jaw members of the guide is illustrated in FIG. 2 from which it will be noted the stationary jaw member 43 has a projection 43A thereon that nests into a corresponding groove 44A in the removable jaw member 44. The removable jaw member 44 has a notch 44B on the base thereof that abuts a ledge 43B on the base of the stationary jaw member. This arrangement allows precise positioning and interlocking of one jaw member relative to the other and both jaw members as illustrated in FIG. 1 fit into a U-shaped saddle type base 46. The above described structure is a robust strong assembly effective in damping saw vibrations. Jaw members 43 and 44 have aligned apertures 43C and 44C for receiving the stud or bolt 45.

Each jaw member of the saw blade guide has three discrete contact pads spaced apart from one another and that project into the channel in the guide for positioning in close proximity to the adjacent side face of the saw blade. Each contact pad is selectively adjustably positionable and consists of a replaceable wear plug 50 of Teflon TM or the like having a stem portion 51 of smaller diameter that projects into a recess 52 in the end of a threaded plug 53. Plugs 53 thread into respective ones of three different threaded apertures 54A, 54B and 54C in the stationary guide member 43 and similarly there are three threaded apertures in the removable jaw member 44 and designated respectively 55A, 55B and 55C. The pair of apertures 54B and 55B are aligned with one another as are also the pair of apertures 54C and 55C and these two pairs of apertures are spaced apart from one another a selected distance in a direction circumferentially around the blade. The preferred center-to-center spacing is equal to the repeating distance around the blade of one gullet plus one tooth width.

Referring to FIG. 3 the threaded apertures 54B and 54C are illustrated positioned so as to be approximately ¼ inch from a broken line designated 60 which represents the bottom of the tooth gullets of the rotating saw blade. The broken line 61 represents the path traced by the tips of the cutting teeth of the blade as the blade rotates, rotation of the blade being in the direction indicated by arrow A. The center to center spacing of threaded apertures 54B and 54C is approximately 3¼ inches for a 44 inch diameter saw blade and represents the spacing of one tooth plus one gullet in the peripheral direction of the saw blade. The third discrete saw blade contact pad is positioned as represented by the threaded aperture 55A in FIG. 3 in a direction radially inwardly of the blade from the other two. This third contact pad is located about ⅜ of the distance from the bottom of a tooth gullet to the center of the blade. The periphery of the blade just inside the gullet line is more susceptible to buckling than the remainder.

From FIG. 2 it will be readily apparent the contact pads 50 can be adjustably positioned by the threaded plugs 53 and such plugs are then locked in position by a respective one of the lock nuts 56. The threaded plugs 53 in FIG. 2 for the respective threaded apertures 54A, 54B and 54C are designated 53A, 53B and 53C.

The direction of rotation of the saw blade in FIG. 1 is again designated by the arrow A. During cutting a slab from the log the carriage B travels in the direction from right to left with reference to FIG. 1.

The guide contact pads or plugs 50 are of a wear resistant low friction material and are positioned so as to have a clearance of about 0.001 inches from the adjacent face of the blade. The threaded plugs, preferably an extra fine thread, provide for such adjustment and positioning of the plugs is locked by the lock nuts 56. The threaded plugs 53 and contact pads 50 have about a 2½ to 3 inch diameter and the jaws of the guide are made from about 1 to 1½ inch thick metal plate.

Illustrated in FIG. 5 is a minor modification where as previously mentioned the guide rests on a platform 42A. As before the base plate 42 is provided with slotted apertures 42A through which threaded studs 42B pass for fastening the guide to the base or foundation 17. The elongated or enlarged apertures 42A permit adjustable movement of the saw blade guide in the directions designated by respective arrows C and D, arrow C being perpendicular to the face of the blade and arrow C parallel thereto.

In practising the foregoing in a plant, alignment of the log carriage is carried out and changes made to the head saw and optimization of the various variable parameters. A thin-kerf blade is used and a robust saw guide installed and adjusted to be in close proximity to the face of the blade. With practising the present invention there is providing a method of improving the yield of lumber from a log in a saw mill by using a thin-kerf, large diameter head saw wherein the extent of wobble in the blade has been minimized by properly locating the blade on the shaft and positioning the shaft so as to have a selected lead angle for the blade relative to the direction of travel of the log during cutting. The rpm of the saw blade is correlated with the saw diameter and the speed of feed and the physical characteristics of the saw blade tooth and material being cut to optimize the operation for the plant. Current lumber recovery can be substantially increased using the "thin-kerf" accurate sawing of the present invention. Use of the thin-kerf blade also substantially reduces the power requirements.

We claim:

1. A saw mill head saw comprising a power driven mandrel, a thin-kerf circular saw blade having a diameter in the range of 34 inches to 60 inches mounted on said mandrel for rotation therewith, means securing said saw blade at a fixed position on said mandrel and a rigid robust saw guide unit securely mounted and located at the in-feed side of the saw, said saw guide unit being at a position below a saw cut made during operation of the head saw and having a gap portion receiving therein a selected portion of the saw blade, said saw guide unit having adjustably positionable blade guiding contact means projecting into said gap, said contact means comprising pads spaced from one another on each of respective opposite side faces of said saw blade for guiding said blade during operation of the same and wherein each of said contact pads is selectively adjustably movable toward and away from the adjacent face of the saw blade.

2. A saw mill head saw as defined in claim 1 wherein said blade guiding contact means comprises said plurality of discrete spaced apart blade contact pads which are selectively spaced in directions radially and circumferentially with respect to the saw blade.

3. A saw mill head saw as defined in claim 2 wherein there are three of said discrete contact pads on each of opposite side faces of said saw blade.

4. A saw mill head saw as defined in claim 3 wherein two of the three pads on each of the respective opposite faces are spaced apart from one another in a direction circumferentially around the saw blade and the third one is spaced from the other two in a direction radially inwardly therefrom in a direction towards the center of the blade.

5. A head saw as defined in claim 1 wherein said saw guide unit has a pair of detachably interconnected jaw members.

6. A head saw as defined in claim 5 wherein one of said jaw members is mounted on a base structure and where the other jaw member is removably mounted on such one jaw member.

7. A head saw as defined in claim 1 including means permitting selectively adjustably moving said saw guide unit for coarse adjustment in the position of said gap relative to opposite side faces of the saw blade.

8. A head saw as defined in claim 1 wherein said thin-kerf saw blade has punch formed teeth and including a tip on each of the respective teeth, said tips being made of a material selected from the group comprising stellite, tungsten carbide, graphite and ceramic.

9. A head saw as defined in claim 1 wherein said saw blade, except for cutting tips on the teeth thereof, is of constant thickness throughout.

10. A saw mill head saw as defined in claim 5 including selectively adjustably movable journals, for mounting said mandrel on a support structure, threaded means mounting said pads for fine adjustment in position relative to the saw blade and saw guide mounting means for selectively adjustably positioning the saw blade guide unit in a coarse adjustment relative to the position of the saw blade.

11. A head saw as defined in claim 10 wherein said thin-kerf circular saw blade has a thickness in the range of 0.10 to 0.15 inches and wherein the kerf is in the range of 0.14 inches to 0.20 inches.

12. A head saw as defined in claim 11 wherein said thin-kerf saw blade has punch formed teeth each with a cutting tip secured thereto, said tips being made of a material selected from the group comprising stellite, tungsten carbide, graphite and ceramic.

13. A head saw as defined in claim 12 wherein said saw blade, except for said cutting teeth, is of the same constant thickness throughout.

14. A head saw as defined in claim 1 wherein said thin-kerf circular saw blade has a constant thickness with such constant thickness being in the range of 0.10 to 0.15 inches, wherein the kerf is in the range of 0.14 inches to 0.20 inches and wherein the saw blade teeth are punch formed with each tooth having a tip secured thereto, said tips being made of a material selected from the group comprising stellite, graphite, tungsten carbide, and ceramic.

15. A head saw as defined in claim 14 wherein said saw blade is of constant thickness throughout.

16. A saw mill head saw comprising a power driven mandrel mounted on selectively adjustably movable journals, a thin-kerf circular saw blade having a diameter in the range of 34 inches to 60 inches mounted on said mandrel for rotation therewith, means retaining said saw blade in a fixed position on said mandrel and a rigid robust saw blade guide unit located at the in-feed side of the saw blade and at a position below a cut made during operation of the head saw, said blade guide unit having a gap portion receiving therein a selected edge portion of the saw blade and a plurality of spaced apart selectively removable replaceable contact pads on each of opposite side faces of said saw blade, contact pad mounting means for selectively adjustably positioning each of said contact pads and saw guide mounting means for selectively adjustably positioning the saw blade guide unit relative to the saw blade and wherein said saw guide unit has a pair of detachably interconnected jaw members, portions of which are spaced from one another providing said gap portion and wherein said contact pads each comprise a wear plug mounted on the end of a plug threaded into a jaw member associated therewith.

17. A head saw as defined in claim 16 wherein one of said jaw members is adjustably movably mounted on a rigid foundation and the other jaw member is detachably mounted on said one jaw member.

18. A head saw as defined in claim 1 wherein said thin-kerf circular saw blade has a thickness in the range of 0.10 to 0.15 inches and wherein the kerf is in the range of 0.14 inches to 0.20 inches.

* * * * *